US008494710B2

(12) United States Patent
Harvie

(10) Patent No.: US 8,494,710 B2
(45) Date of Patent: Jul. 23, 2013

(54) SYSTEM AND METHOD FOR IDENTIFYING A SPATIAL RELATIONSHIP FOR USE IN CALIBRATING ACCELEROMETER DATA

(75) Inventor: Richard Harvie, Glossop (GB)

(73) Assignee: Trimble Navigation Limited, Sunnyvale, CA (US)

( * ) Notice: Subject to any disclaimer, the term of this patent is extended or adjusted under 35 U.S.C. 154(b) by 298 days.

(21) Appl. No.: 13/077,067

(22) Filed: Mar. 31, 2011

(65) Prior Publication Data

US 2012/0253585 A1 Oct. 4, 2012

(51) Int. Cl.
*G01M 17/00* (2006.01)

(52) U.S. Cl.
USPC .............. 701/33.1; 701/469; 701/93; 701/74; 73/1.37

(58) Field of Classification Search
USPC .................... 701/33, 93, 472, 445, 500, 31.4, 701/74; 73/1.37, 495; 702/96; 705/4; 180/6.2, 180/6.24, 6.26; 340/665, 990, 995.28, 669; 244/3.2; 310/318
See application file for complete search history.

(56) References Cited

U.S. PATENT DOCUMENTS

| | | | | |
|---|---|---|---|---|
| 6,308,134 | B1 | 10/2001 | Croyle et al. | |
| 2003/0061859 | A1 * | 4/2003 | Rothoff | 73/1.37 |
| 2007/0225891 | A1 * | 9/2007 | Saposnik | 701/93 |
| 2007/0260398 | A1 * | 11/2007 | Stelpstra | 701/213 |

* cited by examiner

*Primary Examiner* — Behrang Badii

(57) ABSTRACT

Methods and systems for identifying a spatial relationship between a frame of reference associated with an accelerometer mounted in a vehicle and a frame of reference associated with the vehicle Accelerometer data is received from an accelerometer and vehicle data is received from a vehicle network of the vehicle, a long term average of the accelerometer data is used to determine the direction of gravity in the frame of reference of the vehicle. In addition the vehicle date is used to determine changes in speed of the vehicle, and thus to determine the direction of the longitudinal axis of the vehicle in the frame of reference of the vehicle. From these determined directions, the spatial relationship between the frames of reference may be determined.

39 Claims, 11 Drawing Sheets

SYSTEM AND METHOD FOR IDENTIFYING A SPATIAL RELATIONSHIP FOR USE IN CALIBRATING ACCELEROMETER DATA

FIELD OF THE INVENTION

The present invention relates to systems and methods for identifying a spatial relationship between a first and a second frame of reference for use in calibrating accelerometer data and in particular when the first frame of reference is associated with an accelerometer mounted in a vehicle and the second frame of reference is associated with the vehicle.

BACKGROUND

Telematics units are known and may be used to track and monitor vehicles such as cars, motorcycles, vans and trucks. The telematics unit is mounted in the vehicle and gathers information about the status of the vehicle. The telematics unit may then either store the information for later retrieval, or report the information to a remote monitoring station using a mobile communications network.

An exemplary telematics unit may contain a Global Positioning System (GPS) unit, a connection to a vehicle network (such as a Controller-Area Network or CAN) and a connection to a user interface. The GPS unit provides speed and position data, the connection to the vehicle network provides engine status, speed and fault data from the electronic control units (ECUs) of the vehicle, and the user interface enables interaction with the driver of the vehicle. The telematics unit also contains a mobile communications transceiver which communicates with a controlling station and may send the data received through these connections to the controlling station.

Recently, it has been proposed to fit accelerometers into the telematics units and to send, store or use the accelerometer data along with other telematics data. However the difficulty in implementing such a system is that the accelerometer needs to be carefully mounted in the vehicle for the accelerometer data to have meaning. That is, the accelerometer needs to be accurately mounted in a specific orientation relative to the vehicle so that the orientation of the accelerometer data is aligned with the vehicle.

This can be difficult because a technician must take care when installing the telematics system to ensure it is aligned with the vehicle. Equally, this requirement for alignment can severely restrict the potential locations for mounting the telematics device compounding the problems in mounting the telematics unit.

There is therefore a need for a system and method which enables an accelerometer connected to a telematics device to be easily mounted to a vehicle and which enables the accelerometer data to be interpreted such that the direction of the acceleration of the vehicle is known.

SUMMARY OF THE INVENTION

In accordance with at least one embodiment of the invention, methods, devices, systems and software are provided for supporting or implementing functionality to provide for the identification of a spatial relationship between a first and a second frame of reference, as specified in the independent claims.

This is achieved by a combination of features recited in each independent claim. Accordingly, dependent claims prescribe further detailed implementations of the present invention.

According to a first aspect of the invention there is provided a system for identifying a spatial relationship between a first and a second frame of reference for use in calibrating accelerometer data, the first frame of reference being associated with an accelerometer mounted in a vehicle, and the second frame of reference being associated with the vehicle, the system comprising: an interface for receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and a data processing system, wherein the data processing system is arranged to: derive, from a first set of said vector data received during a first period, a first vector indicative of a direction of a vertical axis of the vehicle within the first frame of reference; identify, using the vehicle information, a second period in which the speed of the vehicle is changing; derive, from a second set of said vector data received during the second period, a second vector indicative of a direction of a longitudinal axis of the vehicle within the first frame of reference; and identify, based on the first and second vectors, a spatial relationship between the first and the second frame of reference.

It is unlikely that the accelerometer will be accurately mounted in the vehicle, this may be due to space/fixing constraints (that is the unit containing the accelerometer can only be mounted in one orientation) or may be simply due to time and cost constraints making it difficult to accurately mount the accelerometer. This may result in the accelerometer data output by the accelerometer having, at best, a degree of error, and potentially being meaningless. Advantageously, by determining the first and second vectors in the first frame of reference (that of the accelerometer), the first and second vectors corresponding to the vertical and longitudinal axes of the vehicle (which are known vectors in the second frame of reference), the system is able to identify the spatial relationship between the first frame of reference and the second frame of reference without requiring, for example, manual setup. This spatial relationship may then be used to calculate a direction of an acceleration of the vehicle in the second frame of reference.

By using data indicative of whether the speed of the vehicle is changing, the system is able to determine the longitudinal axis of the vehicle from the longitudinal acceleration due to this change in speed. A further advantage of using vehicle information over, for example GPS information, is that due to the nature of GPS (that is, that GPS determines position) it is difficult to accurately identify periods of acceleration and deceleration since these are second order derivatives of position.

The system may be configured to identify, using the vehicle information, the first period. The system may be configured to identify, from the vehicle information, one or more of: whether an ignition of the vehicle is on; whether an engine of the vehicle is running; and the speed of the vehicle, whereby to identify the first period.

The first period may simply comprise a continuous period for which the system is in operation. However, the system can advantageously take into account the vehicle information to identify the first period. Consequently, by determining whether the ignition is on or that the engine is running, the system can advantageously reduce the possibility that the first vector is skewed by the vehicle being, for example, parked on a slope for a long period.

The system may be configured to calculate a first average of the first set of vector data whereby to derive the first vector. The system may be configured to use a filter to calculate the first average.

An average of the accelerometer data can be used to determine the direction of the vertical axis. By taking an average of the accelerometer data the effects of forward acceleration, braking, cornering and ascending and descending slopes will be averaged out so that the first average is indicative of the acceleration due to gravity, and thus indicative of the vertical axis of the vehicle when the vehicle is on a horizontal surface. The average of the accelerometer data may be an un-weighted or weighted mean. Samples taken over a period of 30 minutes or more may be used to calculate this average. One method of calculating the first average is to use a filter. One form of filter which may be used is a leaky integrator which advantageously reduces the required memory needed to calculate the first average since only the output of the leaky integrator needs to be stored.

The system may be configured to identify, from the vehicle information, a period in which the vehicle is braking whereby to identify the second period. The interface may be configured to receive vehicle information comprising information indicative of a speed of rotation of a shaft of the vehicle, and the data processing system is configured to identify the second period using said information indicative of a speed of rotation of a driven shaft of the vehicle.

Advantageously, by identifying the second period to be a period in which the vehicle is braking, the system is able to ensure that there is a significant component of longitudinal acceleration during the second period. This is because first, the deceleration (i.e. rearwards acceleration) under braking is generally higher than the forwards acceleration provided by the vehicle engine, and second the vehicle is less likely to be turning (which would introduce an error due to a lateral acceleration of the vehicle into the accelerometer data) since vehicles are relatively unstable when braking while going around a corner (and therefore a driver is unlikely to brake while cornering; by contrast many drivers will accelerate around, or at least out of, a corner). The data indicative of the vehicle braking may be provided by the system which provides the road speed (speedometer) data for the vehicle. This data can be provided by measuring the rotational speed of a drive shaft (for example the output shaft of the gearbox) or by measuring the rotational speed of the wheels (which may be done by an anti-lock braking system which then transmits the data on the vehicle network). It will be apparent that the first and second periods may overlap.

The system may be configured to further determine magnitudes of acceleration from the vector data and to compare said magnitudes to a threshold whereby to identify the second period.

Therefore the second period can be identified to be at least one period during which, not only is the vehicle is braking, but the deceleration of the vehicle is high (i.e. the acceleration of the vehicle exceeds a threshold). This can be taken to be indicative of at least one period of hard braking, during which (due to the intrinsic vehicle instability under braking) the vehicle is highly unlikely to be turning, thereby improving the probability that a large component of the acceleration detected by the accelerometer is longitudinal and equally that a lateral component is small.

The system may be configured to determine magnitudes of differences between the vector data and the first vector whereby to determine said magnitudes of acceleration. The system may be configured to determine magnitudes of components of the vector data orthogonal to the first vector whereby to determine said magnitudes of acceleration.

To improve accuracy, the gravitational component can be (mostly) removed, so that only the acceleration due to the braking is represented in the determined magnitudes. The gravitational component (represented by the first vector) can be removed by either subtracting the first vector from the vector data or by calculating the component of the vector data orthogonal to the first vector.

The system may be configured to calculate a second average of the second set of vector data whereby to derive the second vector. The system may be configured to use a filter to calculate the second average. The system may be configured is configured to derive a component of the second average which is orthogonal to the first vector whereby to determine the second vector.

To improve accuracy, an average of the second set of vector data may be used. A filter, for example a leaky integrator, may be used to calculate this second average. The second average may be a shorter term average (compared to the first average), consequently the period over which samples are taken may be shorter. In addition, the vehicle may 'dip' under braking, that is the front of the vehicle drops and the rear of the vehicle rises. Consequently, since the accelerometer (being mounted to the vehicle) will rotate during this dip, the angle of the acceleration due to the braking may vary. Therefore, the system may calculate a component of this acceleration orthogonal to the vertical axis to remove any error due to this variation.

The system may be configured to identify a plurality of rotations based on the directions of the first and second vectors whereby to identify the spatial relationship between the first and the second frame of reference. The system may be configured to calibrate accelerometer data received by the interface using the identified spatial relationship.

The system may comprise a memory configured to store the first and second averages.

The first and second frames of reference may comprise three dimensional frames of reference.

The vehicle network may comprise an on-board vehicle network configured to inter-connect a plurality of electronic control units of the vehicle. The interface may comprise a connector configured to connect to an on board diagnostics port of a vehicle.

According to a second aspect of the invention there is provided a telematics unit for mounting in a vehicle, the telematics unit comprising: an accelerometer arranged to provide accelerometer data comprising vector data indicative of a direction of an acceleration of the accelerometer in a first frame of reference; an interface in communication with a vehicle network of the vehicle and arranged to receive vehicle data comprising vehicle information indicative of an operative state of the vehicle; and data processing system for identifying a spatial relationship between the first frame of reference and a second frame of reference associated with the vehicle for use in calibrating said accelerometer data, wherein the data processing system is arranged to: derive, from a first set of said vector data received during a first period, a first vector indicative of a direction of a vertical axis of the vehicle within the first frame of reference; identify, using the vehicle information, a second period in which the speed of the vehicle is changing; derive, from a second set of said vector data received during the second period, a second vector indicative of a direction of a longitudinal axis of the vehicle within the first frame of reference; and identify, based on the first and second vectors, a spatial relationship between the first and the second frame of reference.

According to a third aspect of the invention there is provided a method for identifying a spatial relationship between a first and a second frame of reference for use in calibrating accelerometer data, the first frame of reference being associated with an accelerometer mounted in a vehicle, and the second frame of reference being associated with the vehicle, the method comprising: receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and deriving, from a first set of said vector data received during a first period, a first vector indicative of a direction of a vertical axis of the vehicle within the first frame of reference; identifying, using the vehicle information, a second period in which the speed of the vehicle is changing; deriving, from a second set of said vector data received during the second period, a second vector indicative of a direction of a longitudinal axis of the vehicle within the first frame of reference; and identifying, based on the first and second vectors, a spatial relationship between the first and the second frame of reference.

According to a fourth aspect of the invention there is provided a computer readable storage medium storing computer readable instructions thereon for execution on a computing system to implement a method for identifying a spatial relationship between a first and a second frame of reference for use in calibrating accelerometer data, the first frame of reference being associated with an accelerometer mounted in a vehicle, and the second frame of reference being associated with the vehicle, the method comprising: receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and deriving, from a first set of said vector data received during a first period, a first vector indicative of a direction of a vertical axis of the vehicle within the first frame of reference; identifying, using the vehicle information, a second period in which the speed of the vehicle is changing; deriving, from a second set of said vector data received during the second period, a second vector indicative of a direction of a longitudinal axis of the vehicle within the first frame of reference; and identifying, based on the first and second vectors, a spatial relationship between the first and the second frame of reference.

Further features and advantages of the invention will become apparent from the following description of preferred embodiments of the invention, given by way of example only, which is made with reference to the accompanying drawings.

BRIEF DESCRIPTION OF THE DRAWINGS

A telematics system will now be described as an embodiment of the present invention, by way of example only, with reference to the accompanying figures in which.

Several parts and components of these embodiments of the invention appear in more than one Figure; for the sake of clarity the same reference numeral will be used to refer to the same part and component in all of the Figures.

DETAILED DESCRIPTION OF ILLUSTRATIVE EMBODIMENTS OF THE INVENTION

Figure 1A:
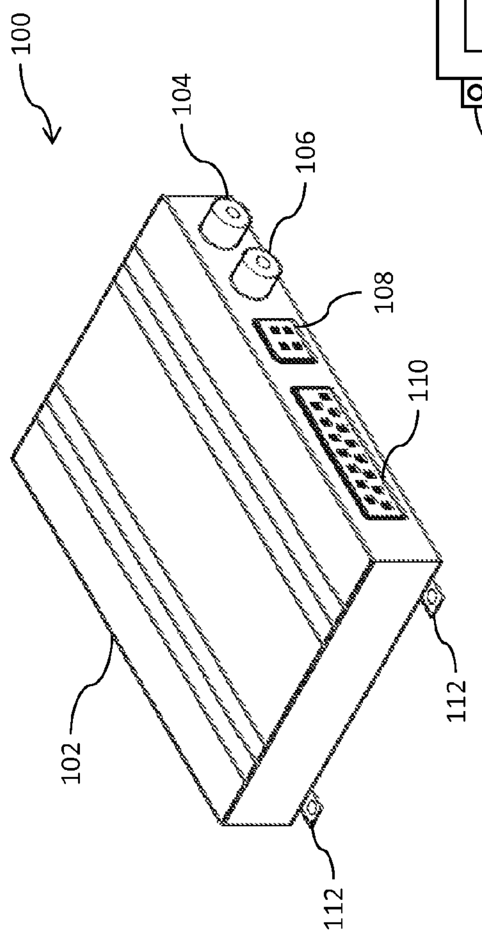
FIG. 1*a* is a perspective view of a telematics unit as may be used in an embodiment of the invention.

FIG. 1 shows a perspective view of a telematics unit 100 according to an embodiment of the invention. The telematics unit 100 has a case 102, on the side of which are a number of connectors 104, 106, 108 and 110.

Of these connectors, a GPS antenna connector 104 and a mobile communications antenna connector 106 enable the telematics unit 100 to be connected to external antennae. Consequently the telematics unit 100 can be mounted in a position in the vehicle, for example in the engine bay, where normally such antenna would be ineffective due to the quantity of metal blocking the signal. The connected antennae may then be mounted in the vehicle in a position where the signal strength is sufficient for effective operation.

User interface connector 108 is provided to connect the telematics unit 100 to a user interface unit (not shown). The user interface unit can be mounted in the cab of the vehicle, and be used, for example, to allow a driver of vehicle login or to provide notifications to the driver.

An On Board Diagnostics (OBD) connector 110 is provided to connect the telematics unit 100 to an OBD connector on the vehicle. The OBD connector provides access to an in vehicle network, such as a CAN bus. The elements of an in vehicle network are described in more detail with reference to FIG. 1*c*.

Finally, the telematics unit 100 has a number of mounting points 112 (two shown) to enable it to be mounted within the vehicle.

Figure 1B:
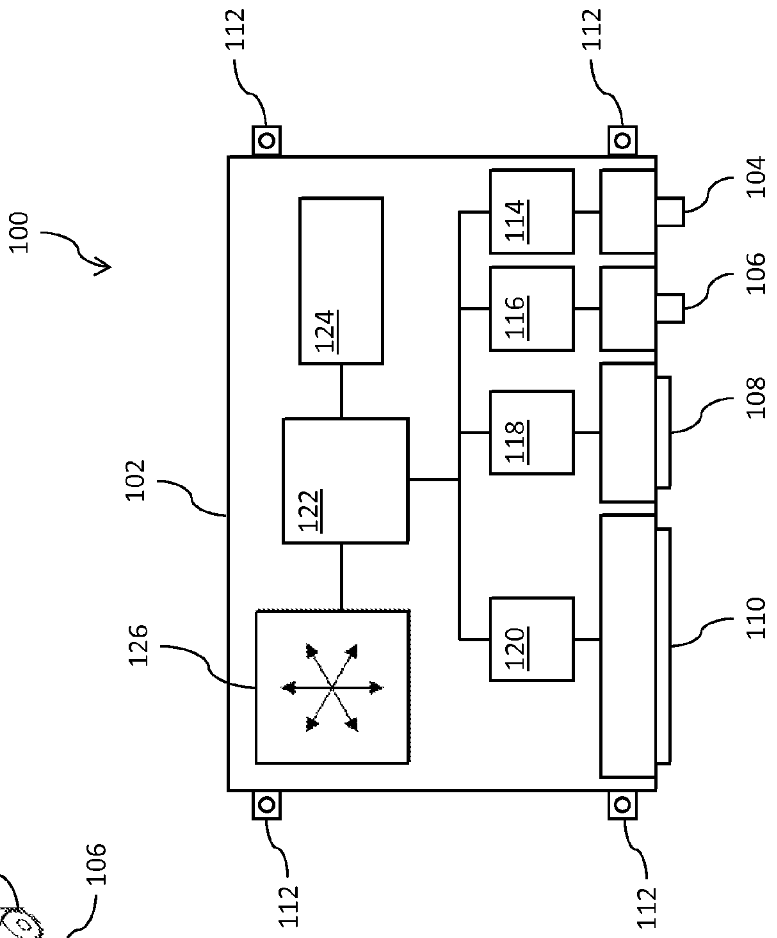
FIG. 1*b* is a schematic diagram showing components of the telematics unit of FIG. 1, including an accelerometer.

FIG. 1*b* shows a plan view of the telematics units 100 showing a schematic diagram of the circuitry inside. In line with FIG. 1*a*, the telematics unit 100 has a case 102, connectors 104, 106, 108 and 110, and mounting points 112.

Within the telematics unit, the GPS antenna connector 104 is connected to GPS circuitry 114. The GPS circuitry 114 receives GPS signals from a GPS antenna (not shown) via the GPS antenna connector 104 and provides the telematics unit with a GPS derived position. The nature of GPS circuitry 114 is known in the art and will not be described in detail.

Similarly mobile communications circuitry 116 is connected to the mobile communications antenna connector 106. The mobile communications circuitry 116 sends and receives signals via a mobile communications antenna (not shown) via the mobile communications antenna connector 106 and thereby provides the telematics unit with the ability to communicate with a controlling station over a mobile communications network. The mobile communications circuitry 116 is also known in the art will not be described in further detail.

Finally each of the user interface connector 108 and the OBD connector 110 are connected to respective driver circuitry 118 and 120. The OBD standard specifies that two pins of the OBD connector provide ground and battery voltage. Therefore the OBD connector may provide power to the telematics unit. All of the GPS circuitry 114, mobile communications circuitry 116 and driver circuitry 118 and 120 are connected to a processor 122. The processor in turn is connected to a memory 124. The processor 122 and memory 124 are arranged to store and execute computer software which enables the telematics unit to operate in accordance with known principles, as well as performing the methods according to embodiments of the invention which are described in more detail below.

A three axis accelerometer 126 is provided within the telematics unit 100 and is connected to processor 122. The three axes of the accelerometer 126 are arranged orthogonal to each other such that the output of the accelerometer 126 comprises three values representing a magnitude of acceleration along each axis of the accelerometer 126. In other words, the output of the accelerometer is a vector in a Cartesian coordinate system. The accelerometer data may be series of three analogue voltages which vary (according to the measured acceleration) between known values (such as +3V to −3V). These voltages may be digitally sampled, either by the accelerometer, the processor or by a dedicated unit (not shown) to provide digital accelerometer data.

The vector represented by the accelerometer data is relative to the accelerometer; that is, the vector is a representation of the acceleration in the frame of reference of the accelerometer. It will be apparent from the description below that the frame of reference of the accelerometer 126 may have no known spatial relationship to the vehicle, due to uncertainties in the mounting of both the accelerometer 126 within the telematics unit 100 and in mounting the telematics unit 100 within the vehicle.

Figure 1C:
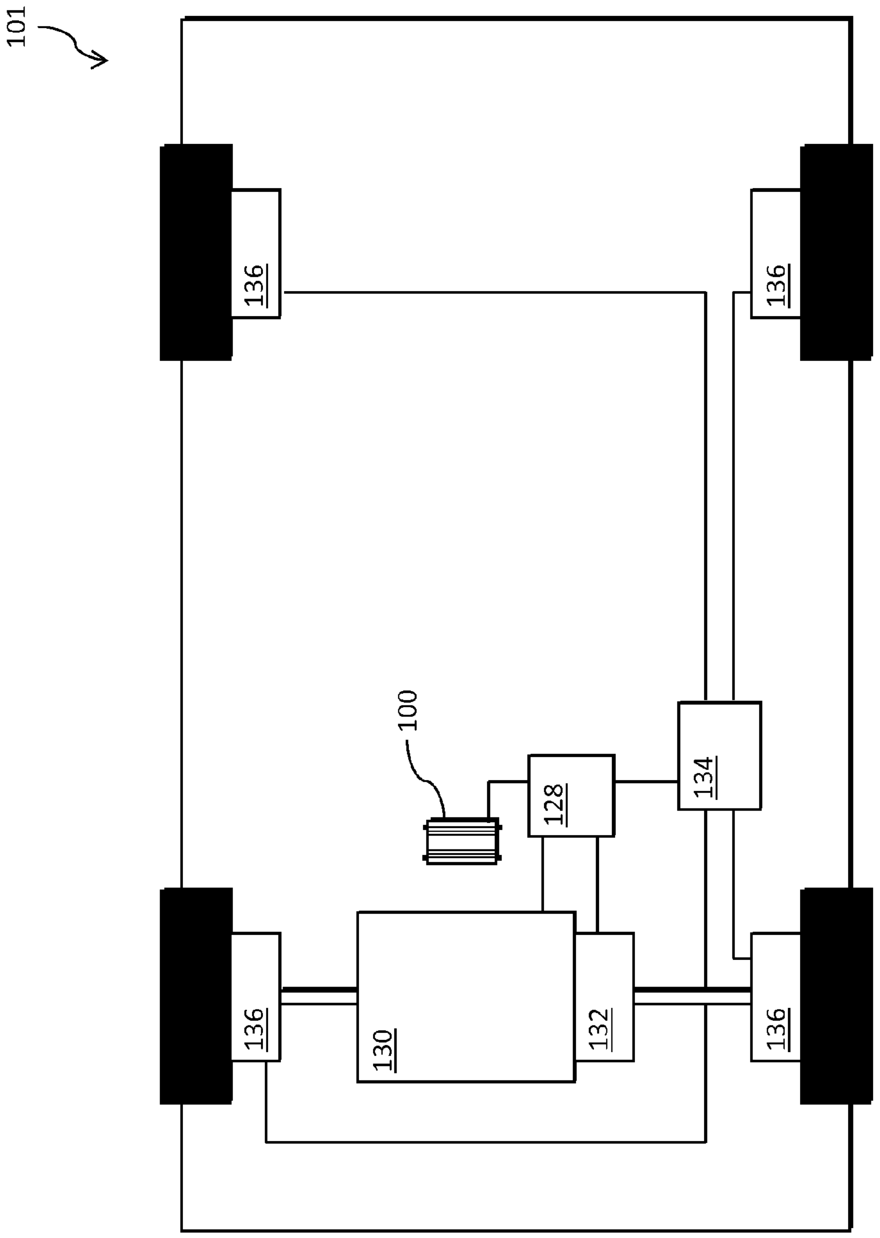
FIG. 1*c* is a cross section plan view of a vehicle in which the telematics unit described in relation to FIGS. 1*a* and 1*b* can be mounted and used.

FIG. 1*c* shows a simplified plan view of a cross section through a vehicle 101 in which a telematics unit 100 in accordance with an embodiment of the invention has been mounted. The units within the vehicle (including the telematics unit) are schematic and are to be taken solely as an example of the units which may be present in a vehicle.

The telematics unit 100 is mounted to the vehicle 101 and is connected to an on-board diagnostics system 128 via the OBD connector 110. This on-board diagnostics system comprises an in vehicle network of interconnected electronic control units (ECUs). Each ECU may send and receive data on the in vehicle network. This on-board diagnostics system 128 collects this data from the in-vehicle network and makes it available to the telematics unit 100. The telematics unit 100 may request the data from the on-board diagnostics system 128; this may be done periodically, for example every second (although other periods are possible, for example multiple times a second, or at 5 or 10 second intervals).

The on-board diagnostics system 128 is connected to, amongst other things, the engine ECU 130, gearbox ECU 132 and anti-lock brake system (ABS) ECU 134. Each of these ECUs may provide the on-board diagnostics system 128 with data relating to the operation of the vehicle. Most of the data provided by these units is unrelated to the embodiments of the invention described herein and will not be described in detail. However, of relevance are e.g. information relating to the rotational speed of the engine provided by the engine ECU 130, information relating to the rotational speed of the gearbox output shaft provided by the gearbox ECU 132, and information relating to the rotational speed of the wheels provided by the ABS ECU 134.

Either or both of the gearbox ECU 132 and the ABS ECU 134 may measure and provide data indicating the rotational speed of a shaft or axle of the vehicle, and provide data indicative of the speed of the vehicle. The gearbox ECU 132 may measure the rotational speed of the output shaft of the gearbox to derive a measure of the speed of the vehicle. The ABS ECU 134 is connected to each wheel's brake system 136 and may use the rotational speed of one or all of the wheels of the vehicle to derive a measure of the speed of the vehicle.

In operation, the engine ECU 130, gearbox ECU 132 and ABS ECU 134 provide their respective data (including the above mentioned data indicating the rotational speed of a shaft or axle of the vehicle) to the on-board diagnostics system 128. Some or all of this data is made available to the telematics unit 100 through the OBD connector 110 where it is received by the processor 122.

The accelerometer 126 measures the acceleration of the vehicle (in the frame of reference of the accelerometer) and passes the associated accelerometer data to the processor 122. The processor 122 may also receive GPS data from the GPS unit 114. The processor may store some or all of this data in memory 124.

The processor 122 uses at least some of the data in accordance with the method described below to identify the spatial relationship between the frame of reference of the accelerometer and the frame of reference of the vehicle. This spatial relationship may then be used by the processor 122 to calculate the acceleration of the vehicle in the frame of reference of the vehicle, that is to provide an output from which the direction of the acceleration of the vehicle is known.

Data indicative of the acceleration of the vehicle, along with any other data received by the processor, may be sent to a monitoring station using the mobile communications unit 106.

Figure 2:
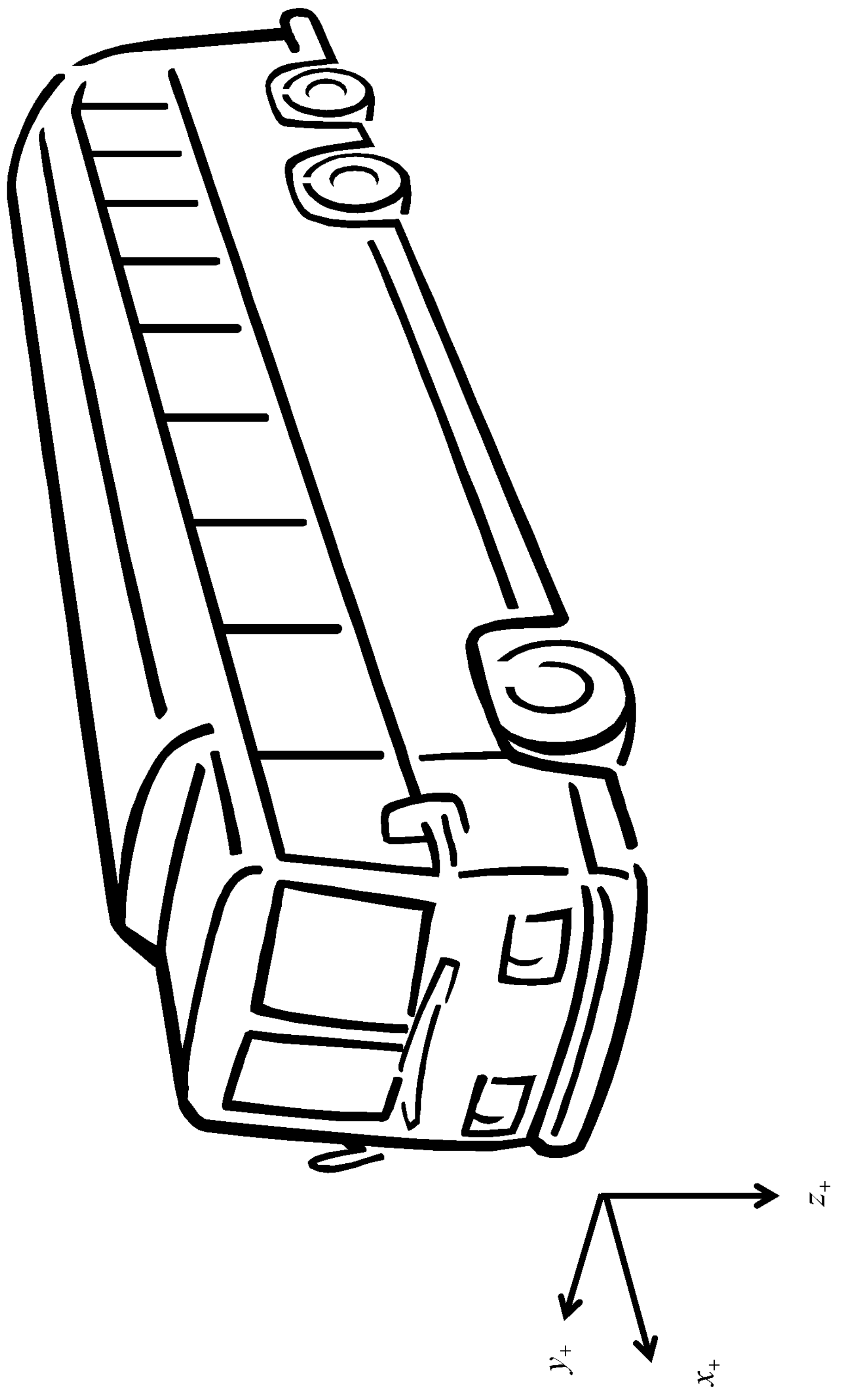
FIG. 2 shows a diagram of a vehicle and shows the directions of the x, y and z axes according to the SAE J670 standard.

FIG. 2 shows a vehicle and the axes of the SAE J670 standard for describing the acceleration of a vehicle. As can be seen, the x axis is used to represent longitudinal (that is, forward and backward) acceleration of the vehicle with the positive x axis pointing in the forward direction. They axis is used to represent lateral (that is, sideways) acceleration of the vehicle with the positive y axis pointing to the right of the vehicle (looking forward). Finally the z axis is used to represent vertical acceleration of the vehicle, with the positive z axis pointing downwards, that is in the direction of the pull of gravity. Overall the three axis conform to the right-hand rule, that is they are right handed Cartesian axes. Symbolically, this arrangement is such that $x \times y = z$, $y \times z = x$ and $z \times x = y$ where x, y and z represent the directions of the respective axes, and x is the cross product of the vectors. This definition of axes will be used throughout this description.

A method of identifying the spatial relationship between the frame of reference of the accelerometer and the vehicle will now be described with reference to FIGS. 3 to 9. In this example, all data is provided with a time index t. It will be understood that as the vehicle is in operation, the accelerometer data will be sampled to provide data at each of the indexed time points. The calculations shown below may be performed at any particular time point, and therefore use the data related to that time point.

In this exemplary embodiment the accelerometer provides accelerometer data which has been sampled at 100 Hz. In a first step, the noise in particular from engine vibrations, may be removed. An idling engine rotates at 600 rpm or higher, corresponding to noise at 10 Hz and higher. Therefore filtering at approximately 5 Hz will remove engine vibrations. In this embodiment, the filtering is performed using a leaky integrator which, as is well known, operates by storing a running average, and for every new data point which is provided, the new running average is calculated based on a weighted average of the old running average and the value of the new data point. The weighting is normally biased in favour of the running average by a fixed factor which may be in the range of 10 to 10,000 depending on the number of data points which are to be taken into account (i.e. the upper frequency bound of the smoothing).

The noisy accelerometer data for a given point in time can be represented by the vector $n_t$ where t represents a time index, each vector $n_t$ being a sample of the output of the accelerometer. The vector $n_t$ comprises three values $n_{x,t}$, $n_{y,t}$ and $n_{z,t}$. These values represent the acceleration of the accelerometer along the three axes x, y and z respectively in the reference frame of the accelerometer, and which are defined as follows:

$$n_t = \begin{bmatrix} n_{x,t} \\ n_{y,t} \\ n_{z,t} \end{bmatrix}$$

Samples of an acceleration vector $a_t$ are calculated from the vector $n_t$ using the leaky integrator. The leaky integrator preferably uses a factor α with a value arranged to give a filtering effect of approximately 5 Hz. With a 100 Hz sampling rate, a value of 0.98 for α will provide an appropriate filtering effect:

$$a_t = \begin{bmatrix} a_{x,t} \\ a_{y,t} \\ a_{z,t} \end{bmatrix} = \alpha n_{t-1} + (1-\alpha)n_t$$

From the filtered acceleration vector samples $a_t$ a long term average vector $l_t$ may be calculated. This vector is taken to represent (that is have both direction and magnitude aligned with) the acceleration due to gravity within the frame of reference of the accelerometer. The vehicle may be accelerating, decelerating, turning and travelling up and down inclines; therefore by taking a long term average, all these non-gravitational accelerations will largely cancel each other out, leaving only the acceleration due to gravity.

The long term average may be calculated based on all samples of the acceleration vector $a_t$ received by the telematics unit, or alternatively from a subset of these samples. The subset may be defined by, for example, a criteria such as the ignition of the engine being on. These criteria may be determined based on vehicle data received from the in vehicle network via the OBD port 110.

A second leaky integrator may additionally be used for calculating the long term average vector $l_t$; this second leaky integrator has a factor β with β>>α to provide a much longer averaging period. In one arrangement, it is desirable to average over a period of 10 minutes or more (for example 30 minutes or 1 hour are potential averaging periods) in which case β may have a value of 0.99998 (at 100 Hz).

Therefore:

$$l_t = \begin{bmatrix} l_{x,t} \\ l_{y,t} \\ l_{z,t} \end{bmatrix} = \beta a_{t-1} + (1-\beta)a_t$$

Figure 3:
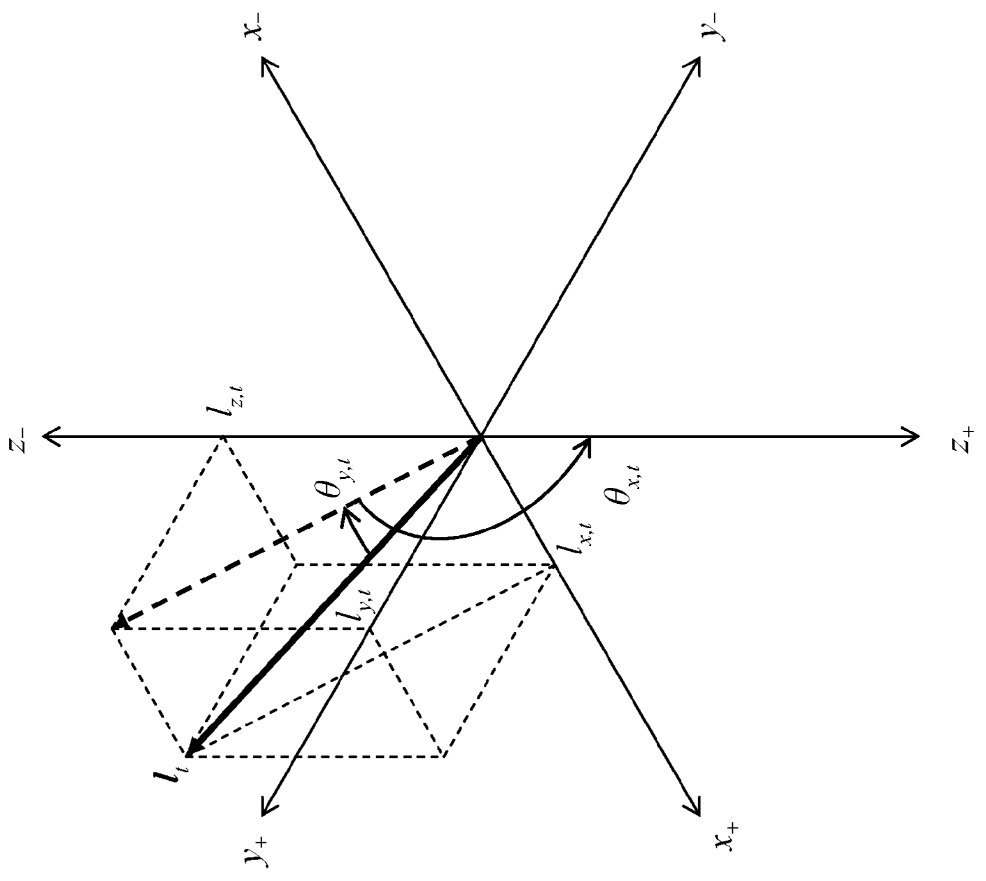
FIG. 3 shows a vector $l_t$ representing a long term average output of the accelerometer in the frame of reference of the accelerometer.

The vector $l_t$ is represented in FIG. 3. As mentioned above, $l_t$ represents the acceleration due to gravity; that is, $l_t$ as a vector in the frame of reference of the accelerometer is aligned with the downward vertical direction in the frame of reference of the vehicle. As can be seen in FIG. 3, in this example the long term average vector $l_t$ extends into the positive x and y and negative z region (this will not necessarily be the case for other configurations of the accelerometer. The long term average vector $l_t$ is represented by a thick solid arrow and a dashed arrow is provided to show the projection of the long term average vector $l_t$ onto the y-z plane. The rotation about the x axis (described below) is measured in the y-z plane, therefore this projection is used to calculate the angle.

From $l_t$ a pair of angles, $\theta_{x,t}$ and $\theta_{y,t}$ are calculated. These two angles represent the rotations required to align $l_t$ with the downward vertical axis (positive z axis) of the second frame of reference (the frame of reference of the vehicle). The angle $\theta_{x,t}$ represents a first rotation, which is a rotation around the x axis. The angle is measured as the angle between the positive z axis and the projection of the long term average vector $l_t$ onto the y-z plane (the dashed arrow).

The angle $\theta_{y,t}$ represents a second rotation, which is a rotation around the y axis. In this embodiment the rotation about the y axis is performed after the rotation about the x axis; therefore the angle is not measured between the original long term average vector $l_t$ and the z axis, but between the long term average vector $l_t$ and the projection of $l_t$ onto the y-z plane.

Figure 4A:
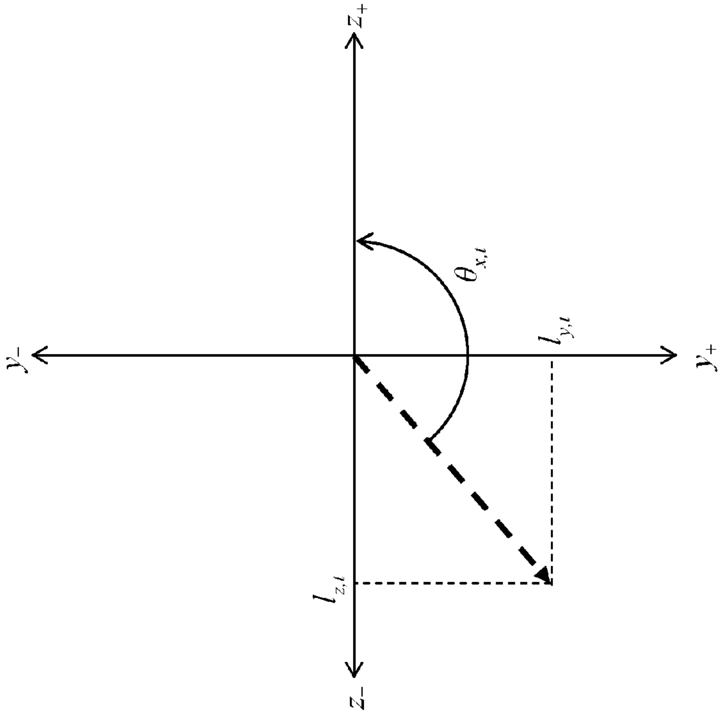
FIGS. 4*a* and 4*b* show a pair of rotations $\theta_{x,t}$ and $\theta_{y,t}$ which may be derived from the vector $l_t$.
Figure 4B:
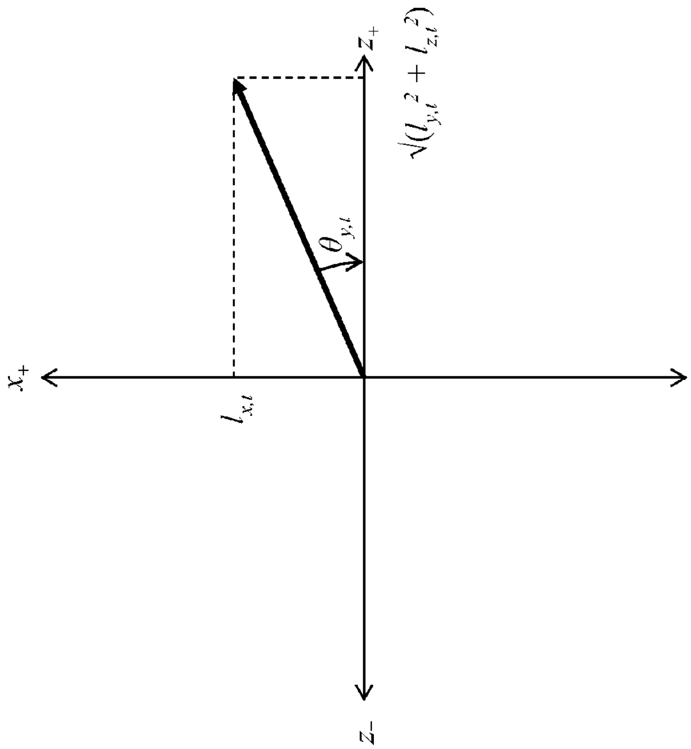

FIGS. 4*a* and 4*b* show the two angles in a two dimensional representation viewed along a respective axis (from the positive direction towards the negative axis).

Since rotations are normally calculated with reference to the positive x axis, these representations have been rotated so that the positive z axis is aligned with the traditional position of the positive x axis (horizontal, pointing to the right).

The function used to determine the angles of rotations may be the two argument a tan 2(y, x) function, which calculates the angle between the positive x axis and a two dimensional vector extending from the origin to the coordinates x and y. As such the a tan 2(y, x) function is related to the a tan(y/x) function, but is able to provide a unique solution for all points in the x, y plane.

Symbolically a tan 2(y, x) is represented by:

$$a\tan2(y,x) = \begin{cases} \arctan(y/x) & x > 0 \\ \pi + \arctan(y/x) & y \geq 0, x < 0 \\ -\pi + \arctan(y/x) & y < 0, x < 0 \\ \pi/2 & y > 0, x = 0 \\ -\pi/2 & y < 0, x = 0 \\ \text{undefined} & y = 0, x = 0 \end{cases}$$

In addition, the a tan 2(y, x) function can be considered to represent the argument of the complex number x+iy, that is:

$$a\tan 2(y,x)=\mathrm{Arg}(x+iy)$$

As can be seen from FIG. 4*a*, the first rotation angle $\theta_{x,t}$ is calculated using the formula:

$$\theta_{x,t}=-a\tan 2(-l_{y,t},l_{z,t})$$

The negative of the a tan 2 function is taken in order to derive the rotation towards the z axis. In addition, the angle is calculated using the negative of the y axis value $l_{y,t}$ and the positive of the z axis value $l_{z,t}$ due to the alignment of the axis (as can be seen from FIG. 4*a*, the positive y axis extends downward).

Having calculated the rotation about the x axis (angle $\theta_{x,t}$), the rotation about the y axis is calculated. The formula for this second rotation is similar to that used to calculate the first rotation, however in this case the arguments used in the a tan 2 function are the x axis value and the combined value of the y and z axis values. The combined value is used because this is the new z axis value after the first rotation—the combined value is calculated using Pythagoras' theorem, $\sqrt{(l_{y,t}^2+l_{z,t}^2)}$.

Therefore:

$$\theta_{y,t}=-a\tan 2(l_{x,t},\sqrt{l_{y,t}^2+l_{z,t}^2})$$

The first two rotations, $\theta_{x,t}$ and $\theta_{y,t}$ are sufficient to rotate the measured acceleration such that acceleration aligned with the vertical direction in the frame of reference of the vehicle is aligned with the z axis in the rotated vector; however, any accelerations in the plane orthogonal to this vertical direction will have an unknown horizontal direction.

Figure 5:
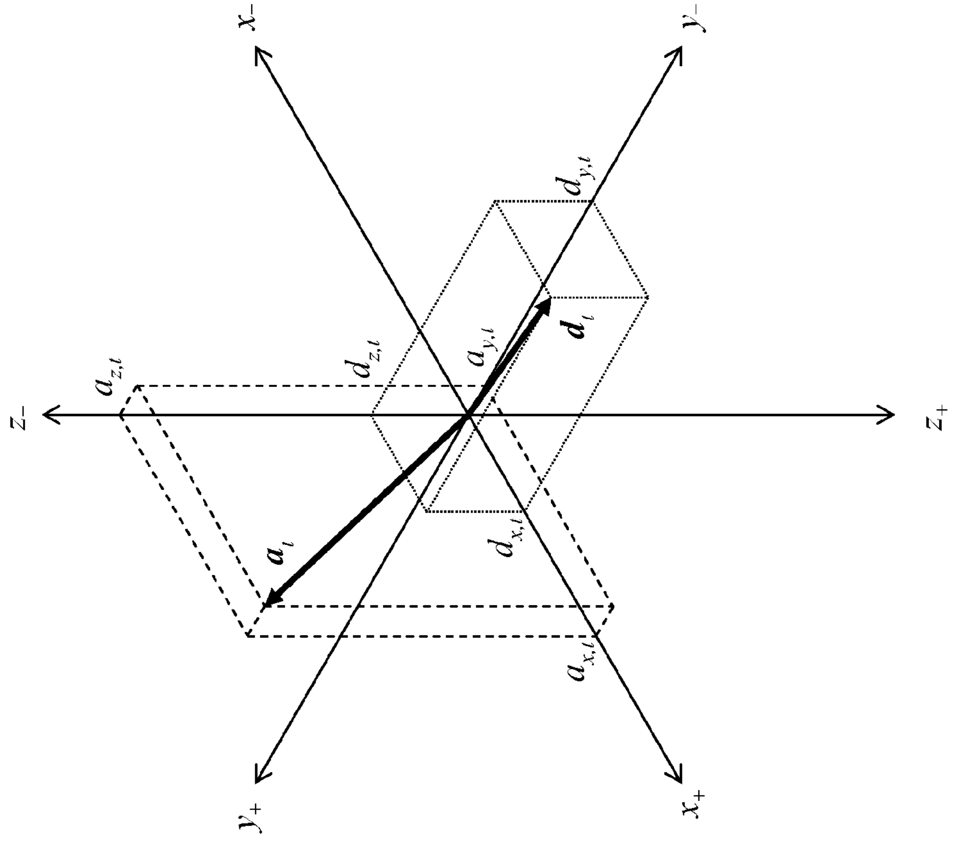
FIG. 5 shows how a vector $d_t$ representing acceleration without a gravitational component is derived from accelerometer data $a_t$ and the vector $l_t$.

The long term average vector $l_t$ and the calculated angles $\theta_{x,t}$ and $\theta_{y,t}$ may subsequently be used to transform any subsequent input acceleration vector $a_t$. Firstly a derived vector $d_t$, indicative of an acceleration excluding gravity, is calculated by subtracting the long term average $l_t$ (representing gravity) from the acceleration vector $a_t$. FIG. 5 provides a representation of this, showing the vectors $d_t$ and $a_t$.

Figure 6B:
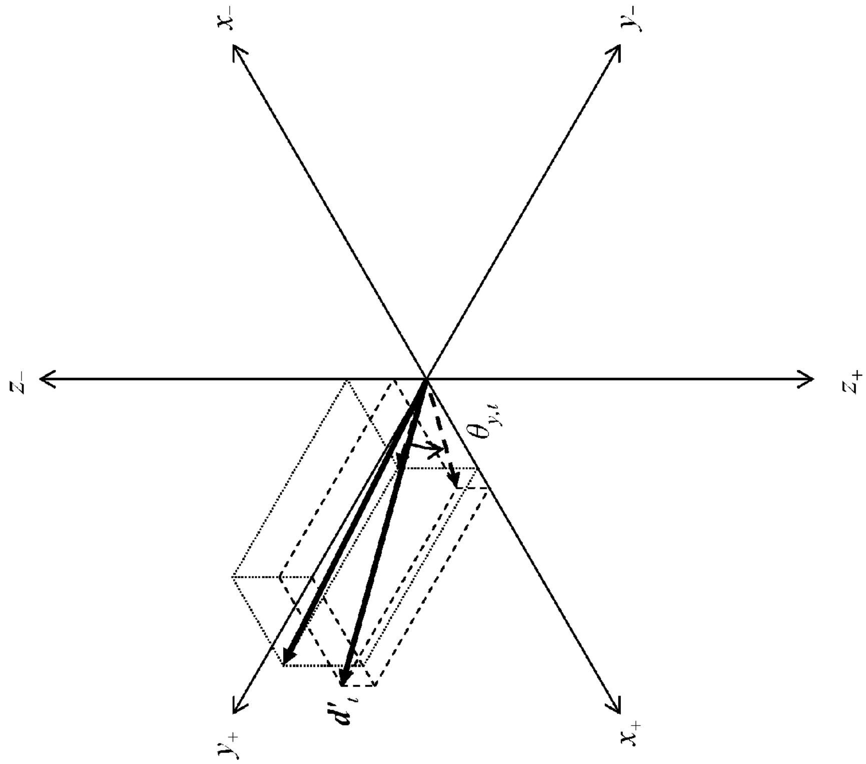
FIGS. 6*a* and 6*b* show the rotations $\theta_{x,t}$ and $\theta_{y,t}$ being applied to the vector $d_t$ to produce the vector $d'_t$.
Figure 6A:
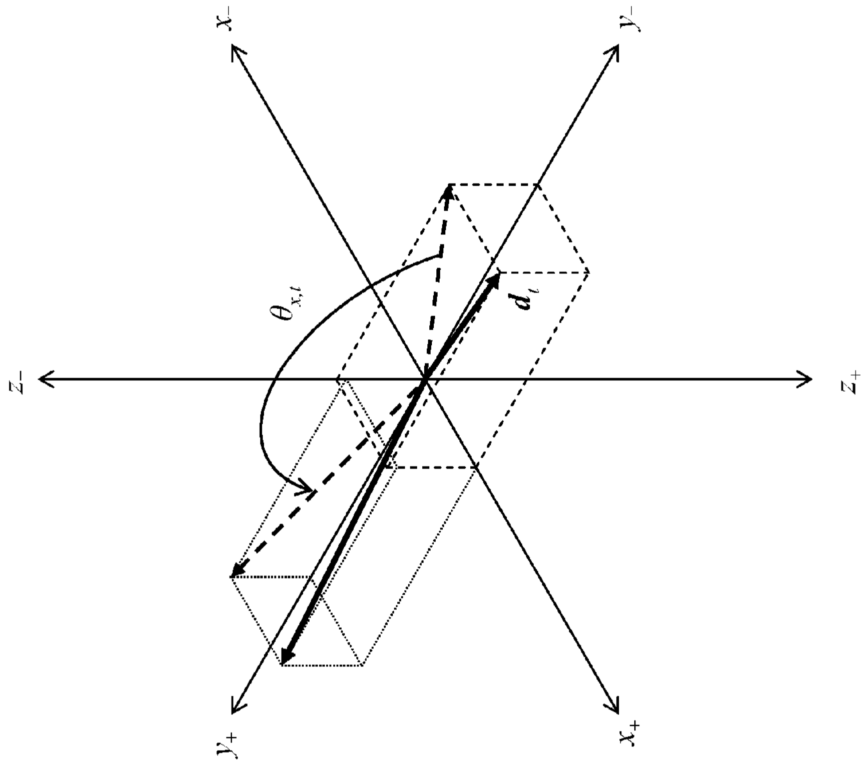

Secondly, the derived vector $d_t$ is rotated by the angles $\theta_{x,t}$ and $\theta_{y,t}$ to give the vector $d'_t$. These rotations are shown in FIGS. 6*a* and 6*b*

In vector notation this is represented as follows. First the acceleration without gravity is calculated:

$$d_t=\begin{bmatrix} d_{x,t} \\ d_{y,t} \\ d_{z,t} \end{bmatrix}=a_t-l_t$$

The derived vector $d_t$ is rotated to provide vector $d'_t$, representing the acceleration rotated by angles, $\theta_{x,t}$ and $\theta_{y,t}$:

$$d'_t=\begin{bmatrix} d'_{x,t} \\ d'_{y,t} \\ d'_{z,t} \end{bmatrix}=A_yA_xd_t$$

Where $A_x$ and $A_y$ represent the rotations by angles $\theta_{x,t}$ and $\theta_{x,t}$, which in matrix notation are:

$$A_x=\begin{bmatrix} 1 & 0 & 0 \\ 0 & \cos\theta_{x,t} & -\sin\theta_{x,t} \\ 0 & \sin\theta_{x,t} & \cos\theta_{x,t} \end{bmatrix}$$

$$A_y=\begin{bmatrix} \cos\theta_{y,t} & 0 & \sin\theta_{y,t} \\ 0 & 1 & 0 \\ -\sin\theta_{y,t} & 0 & \cos\theta_{y,t} \end{bmatrix}$$

and may be combined as follows:

$$A_yA_x=\begin{bmatrix} \cos\theta_{y,t} & \sin\theta_{x,t}\sin\theta_{y,t} & \cos\theta_{x,t}\sin\theta_{y,t} \\ 0 & \cos\theta_{x,t} & -\sin\theta_{x,t} \\ -\sin\theta_{y,t} & \sin\theta_{x,t}\cos\theta_{y,t} & \cos\theta_{x,t}\cos\theta_{y,t} \end{bmatrix}$$

$d'_t$ may therefore be directly calculated using the following formula:

$$d'_t=\begin{bmatrix} \cos\theta_{y,t}d_{x,t}+\sin\theta_{x,t}\sin\theta_{y,t}d_{y,t}+\cos\theta_{x,t}\sin\theta_{y,t}d_{z,t} \\ \cos\theta_{x,t}d_{y,t}-\sin\theta_{x,t}d_{z,t} \\ -\sin\theta_{y,t}d_{x,t}+\sin\theta_{x,t}\cos\theta_{y,t}d_{y,t}+\cos\theta_{x,t}\cos\theta_{y,t}d_{z,t} \end{bmatrix}$$

The rotated vector $d'_t$ may subsequently be used to derive the angle of the third rotation $\theta_{z,t}$ as will now be described. The telematics unit determines periods in which the acceleration of the vehicle is in the longitudinal direction in the frame of reference of the vehicle (that is forward and backward). It should be noted that "acceleration" is used herein to describe all changes in velocity whether positive or negative To detect periods with a strong longitudinal acceleration, and minimal lateral (sideways) acceleration, the telematics unit looks for periods of braking, and preferably harsh braking. Braking can be determined from the data received from the in vehicle network/on board diagnostics system via the OBD connector 110. In particular, the telematics unit may use the speedometer data of the vehicle to detect this braking. The speedometer data of the vehicle is typically derived from the rotational speed of at least one shaft (gearbox output shaft or wheel axle) of the vehicle.

The telematics unit therefore detects periods of braking in which the speed of the vehicle is decreasing by identifying changes in the speed of the vehicle which exceed a threshold value in a given period of time. For example a acceleration of 0.25 g represents a change in speed of approximately 6 miles per hour (9 km per hour) each second.

In addition, the accelerometer data can be used to determine harsh braking, by identifying periods where the magnitude of the acceleration (excluding gravity) is greater than a threshold. This threshold may be set at, for example, 0.25 g, so that symbolically, harsh braking is determined to occur during periods in which:

$$|d_t|=|d'_t|>0.25\times|l_t|$$

The advantage of detecting braking as opposed to acceleration is that minimal lateral accelerations are present in the accelerometer data. This is because, in general, vehicles do not turn while braking due to the intrinsic instability of braking while turning. Moreover, the harsher the braking criterion (i.e. the larger the threshold) the greater the probability that lateral accelerations are at a minimum. During the periods of braking, the values of $d'_t$ may be passed to a third leaky integrator which calculates an average of these values. The periods of braking are represented herein by the time values $t_i$ which are themselves indexed by index value i. The set of indexed time values $t_i$ contains all values of t during which harsh braking occurs and arranged such that $t_i > t_{i-1}$ for all i (i.e. that the index i increases as the time t increases).

The vector representing harsh braking $h_t$ may be derived using the third leaky integrator configured with a factor γ of 0.9, and where i is determined such that $t_i < t < t_{i+1}$, therefore:

$$h_t = \begin{bmatrix} h_{x,t} \\ h_{y,t} \\ h_{z,t} \end{bmatrix} = \gamma d'_{t_{i-1}} + (1-\gamma) d'_{t_i}$$

Figure 7A:
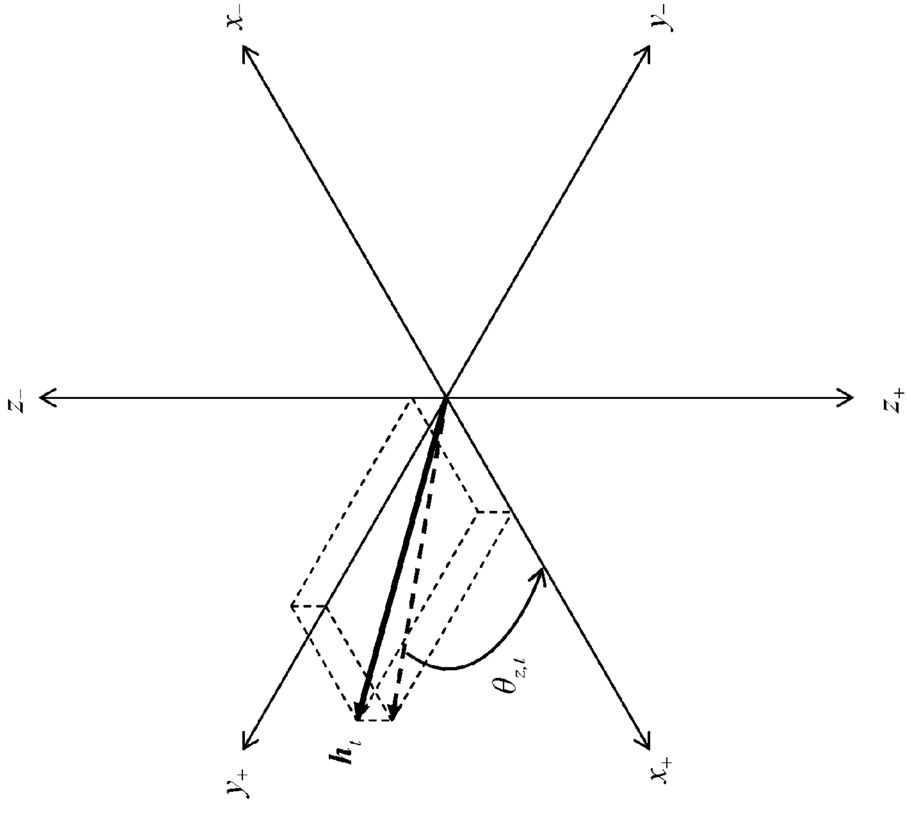
FIGS. 7*a* and 7*b* show a further rotation $\theta_{z,t}$ which may be derived from the vector $d'_t$.
Figure 7B:
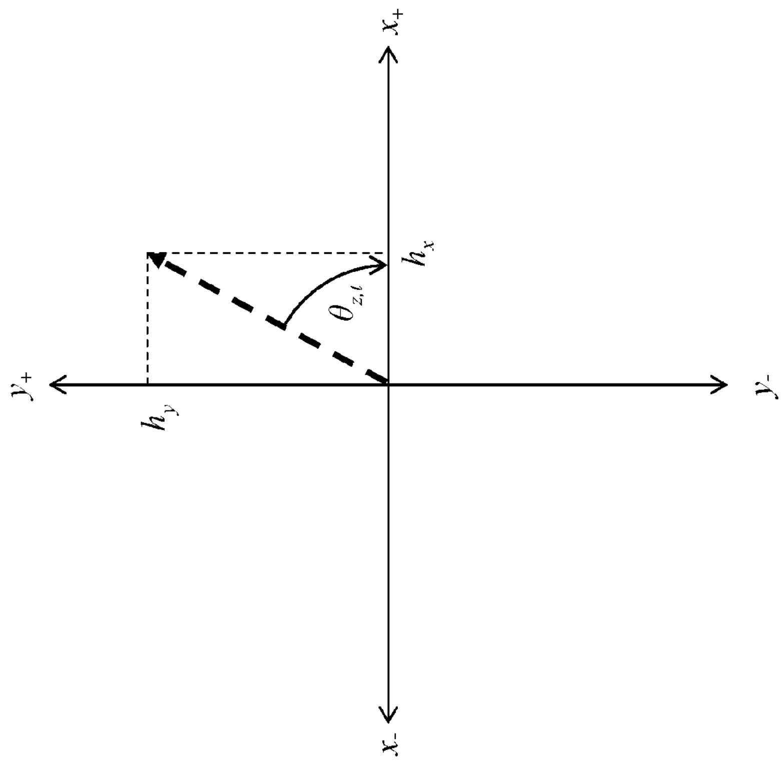

An example of $h_t$ is shown in FIG. 7*a*. In addition in FIGS. 7*a* and 7*b* the angle $\theta_{z,t}$ representing a rotation about the z axis is shown where:

$$\theta_{x,t} - a\tan 2(h_{y,t}, h_{x,t})$$

Consequently the final rotation about the z axis can be derived:

$$A_Z = \begin{bmatrix} \cos\theta_{z,t} & -\sin\theta_{z,t} & 0 \\ \sin\theta_{z,t} & \cos\theta_{z,t} & 0 \\ 0 & 0 & 1 \end{bmatrix}$$

Combining the rotations, the overall rotation A is:

$$A = A_Z A_Y A_X = \begin{bmatrix} \cos\theta_{y,t}\cos\theta_{z,t} & \sin\theta_{x,t}\sin\theta_{y,t}\cos\theta_{z,t} - \cos\theta_{x,t}\sin\theta_{z,t} & \cos\theta_{x,t}\sin\theta_{y,t}\cos\theta_{z,t} + \sin\theta_{x,t}\sin\theta_{z,t} \\ \sin\theta_{z,t}\cos\theta_{y,t} & \sin\theta_{x,t}\sin\theta_{y,t}\sin\theta_{z,t} + \cos\theta_{x,t}\cos\theta_{z,t} & \cos\theta_{x,t}\sin\theta_{y,t}\sin\theta_{z,t} - \sin\theta_{x,t}\cos\theta_{z,t} \\ -\sin\theta_{y,t} & \sin\theta_{x,t}\cos\theta_{y,t} & \cos\theta_{x,t}\cos\theta_{y,t} \end{bmatrix}$$

Having calculated the three rotations, accelerometer vector $a_t$ may be rotated to provide a measure of the acceleration of the vehicle $c_t$, in the frame of reference of the vehicle. Vector $c_t$ may be considered to be the calibrated output of the accelerometer. Therefore:

$$c_t = \begin{bmatrix} c_{x,t} \\ c_{y,t} \\ c_{z,t} \end{bmatrix} = A(a_t - l_t)$$

In addition to rotating $a_t$ to give $c_t$, the magnitude of $l_t$ may be used to scale the measured acceleration in terms of the magnitude of the acceleration due to gravity at the surface of the earth (also known as 'g') since $|l_t| \cong g$. This may be done by, e.g. dividing by the magnitude of $l_t$. Therefore $c'_t$, representing the rotated acceleration vector $c_t$ scaled with respect to g is calculated as follows:

$$c'_t = \begin{bmatrix} c'_{x,t} \\ c'_{y,t} \\ c'_{z,t} \end{bmatrix} = \frac{A(a_t - l_t)}{|l_t|}$$

Figure 8:
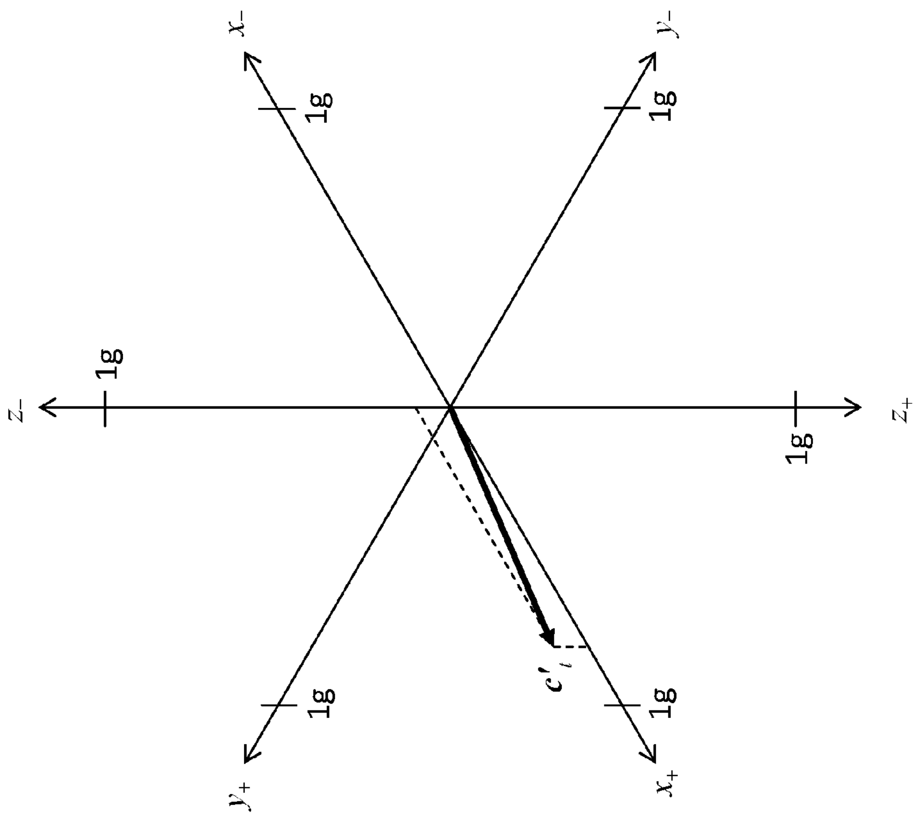
FIG. 8 shows a resultant vector $c'_t$ representing an acceleration aligned with the axis of a vehicle and which is derived from $d_t$ using the three rotations $\theta_{x,t}$, $\theta_{y,t}$ and $\theta_{z,t}$.

FIG. 8 shows such a rotated and scaled vector $c'_t$. In the example shown in FIG. 8 $c'_t$ represents harsh braking. It will be noted that $c'_t$ has a small component of vertical acceleration, caused by the vehicle 'dipping' under braking (dipping being the action whereby the nose of the vehicle drops and the rear of the vehicle rises under braking). FIG. 8 shows scalars (of 1 g) on the axes to represent the scaling of $c'_t$. Therefore it can be seen that $c'_t$ in this case represents acceleration under braking (i.e. deceleration) of approximately 0.8 g.

Figure 9A:
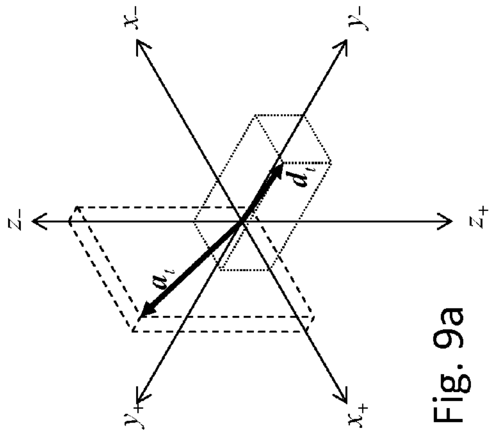
FIGS. 9*a* to 9*e* show the outputs of the steps in deriving resultant vector $c'_t$ from $a_t$ using the vector $l_t$ and the three rotations $\theta_{x,t}$, $\theta_{y,t}$ and $\theta_{z,t}$.

FIGS. 9*a* to 9*e* are a pictorial representation of the whole process of calculating the vector $c'_t$ using the three rotations and the long term average vector $l_t$. Firstly, as shown in FIG. 9*a*, the long term average is subtracted from the accelerometer data $a_t$ to provide the vector $d_t$ which represents the acceleration of the vehicle, without gravity, and in the frame of reference of the accelerometer.

Figure 9B:
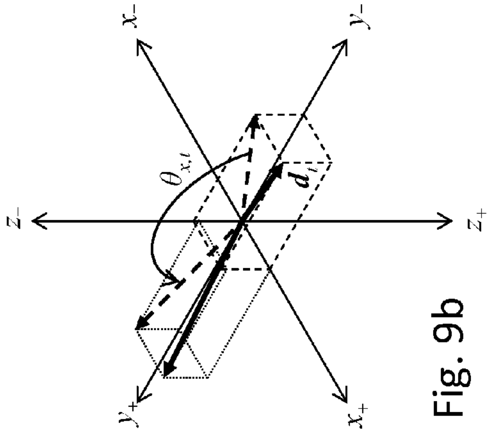
Figure 9C:
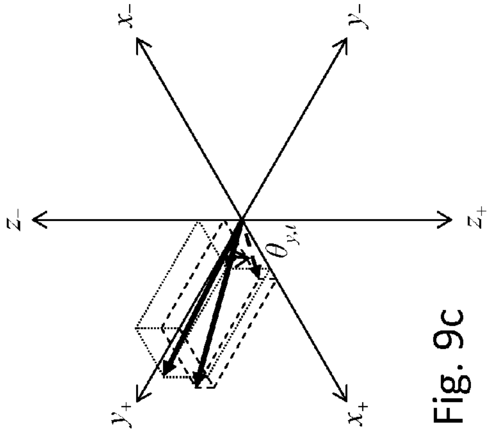
Figure 9D:
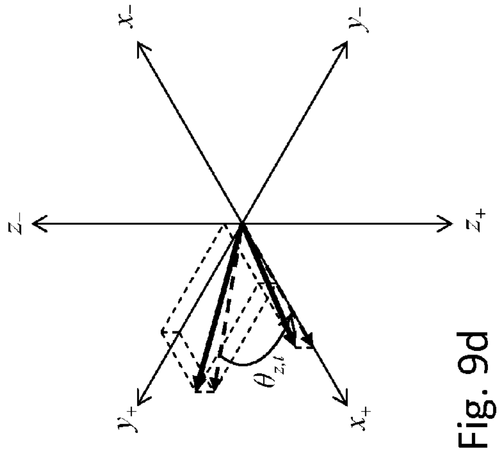
Figure 9E:
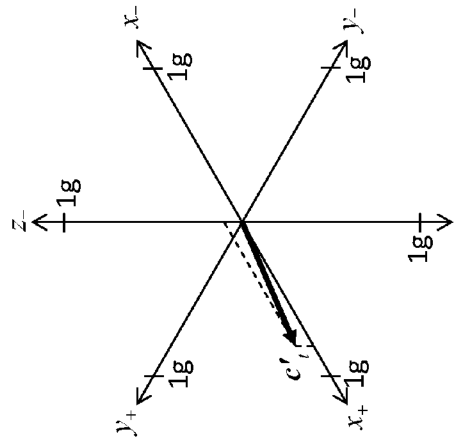

FIGS. 9*b*, 9*c* and 9*d* show the vector $d_t$ rotated by the three rotations of angle $\theta_{x,t}$, $\theta_{y,t}$ and $\theta_{z,t}$ about the x, y and z axis respectively. Finally, FIG. 9*e* shows the final vector, $c'_t$ representing the scaled acceleration of the vehicle in the frame of reference of the vehicle.

In the above method, the derived vector $d_t$ is calculated by subtracting the long term average $l_t$ from the received acceleration data $a_t$, and then rotating the output to find the third rotation angle $\theta_{z,t}$. However in some embodiments of the invention the harsh braking vector $h_t$ may simply be calculated by rotating $a_t$ through angles $\theta_{x,t}$ and $\theta_{y,t}$ since the third rotation $\theta_{z,t}$ is only dependent on the angle of the rotated vector in the x-y plane (and therefore intrinsically excludes any vertical components, that is components in the direction of the vector $l_t$).

An alternative method of deriving the rotations to be applied to the measured acceleration data $a_t$ will now be described. This method does not calculate rotations in terms of their angles, but rather derives the components of a single rotation matrix A which can then be used to rotate the acceleration vector (excluding gravity) $d_t$ to give the acceleration of the vehicle in the frame of reference of the vehicle.

In line with the method described above, a long term average $l_t$ is calculated from the received accelerometer data $a_t$. Then, using $l_t$, a derived vector $d_t$ representing accelerometer data excluding gravity can be calculated:

$$d_t = \begin{bmatrix} d_{x,t} \\ d_{y,t} \\ d_{z,t} \end{bmatrix} = a_t - l_t$$

The vector $d_t$ may then be used, as described above, in the detection of harsh braking events (i.e. where $|d_t| > 0.25 \times |l_t|$). In addition, a leaky integrator can be used to average the acceleration vector during these harsh braking events to derive $h_t$ where:

$$h_t = \begin{bmatrix} h_{x,t} \\ h_{y,t} \\ h_{z,t} \end{bmatrix} = \gamma d_{t_{i-1}} + (1-\gamma) d_{t_i}$$

In this case, the harsh braking vector is derived from the un-rotated acceleration; that is the harsh braking vector is in the frame of reference of the accelerometer (which is the same frame of reference as $l_t$).

From $l_t$ and $h_t$ three orthogonal, normalized vectors in the frame of reference of the accelerometer, which are known to be aligned with the three axes (longitudinal, lateral and vertical) of the vehicle can be derived.

The normalized vector aligned with the z axis (vertical axis) of the vehicle can be calculated by normalizing $l_t$ as shown:

$$\hat{l}_t = \begin{bmatrix} \hat{l}_{x,t} \\ \hat{l}_{y,t} \\ \hat{l}_{z,t} \end{bmatrix} = \frac{l_t}{|l_t|}$$

Using $\hat{l}_t$ and $h_t$ a second vector, $b_t$ representing the direction of the forward longitudinal axis can be calculated. The harsh braking vector $h_t$ is known to contain only components of forward and vertical acceleration (in the frame of the vehicle), therefore by removing the vertical components, only the forward, longitudinal, component is left. Therefore, the vector $b_t$ is calculated to be in the plane of $\hat{l}_t$ and $h_t$ and orthogonal to $\hat{l}_t$ (which is to say that all components parallel to $\hat{l}_t$ are removed). This can be done by subtracting a vector aligned with $\hat{l}_t$ but scaled according to the dot product of $h_t$ and $\hat{l}_t$. From $b_t$ a normalized vector can be calculated.

Therefore:

$$b_t = \begin{bmatrix} b_{x,t} \\ b_{y,t} \\ b_{z,t} \end{bmatrix} = h_t = \hat{l}_t(h_t \cdot \hat{l}_t) = h_t - \frac{l_t(h_t \cdot l_t)}{|l_t|^2}$$

and $$\hat{b}_t = \begin{bmatrix} \hat{b}_{x,t} \\ \hat{b}_{y,t} \\ \hat{b}_{z,t} \end{bmatrix} = \frac{b_t}{|b_t|}$$

Finally a vector $\hat{s}_t$, orthogonal to both $\hat{l}_t$ and $\hat{b}_t$, can be calculated. As $\hat{l}_t$ and $\hat{b}_t$ are known to be aligned with the vertical and longitudinal axes of the vehicle, the vector orthogonal to both these vectors ($\hat{s}_t$) will be aligned with the lateral (side to side) axis of the vehicle. $\hat{s}_t$ can be calculated from the vector cross product of $\hat{l}_t$ and $\hat{b}_t$. Therefore:

$$\hat{s}_t = \begin{bmatrix} \hat{s}_{x,t} \\ \hat{s}_{y,t} \\ \hat{s}_{z,t} \end{bmatrix} = \hat{l}_t \times \hat{b}_t = \begin{bmatrix} \hat{l}_{y,t}\hat{b}_{z,t} - \hat{l}_{z,t}\hat{b}_{y,t} \\ \hat{l}_{z,t}\hat{b}_{x,t} - \hat{l}_{x,t}\hat{b}_{z,t} \\ \hat{l}_{x,t}\hat{b}_{y,t} - \hat{l}_{y,t}\hat{b}_{x,t} \end{bmatrix}$$

From these three orthogonal vectors, and the fact that the product of the rotation matrix A with a vector in the frame of reference of the accelerometer is a corresponding vector in the frame of reference of the vehicle, the rotation matrix A can be derived.

Moreover, since $\hat{l}_t$ is known to be aligned with the direction of the positive vertical axis of the vehicle (z+), the product of A and $\hat{l}_t$ is known:

$$A\hat{l}_t = \begin{bmatrix} 0 \\ 0 \\ 1 \end{bmatrix}$$

Similarly, since $\hat{b}_t$ is known to point in the direction of the positive longitudinal axis of the vehicle (x+), the product of A and $\hat{b}_t$ is known:

$$A\hat{b}_t = \begin{bmatrix} 1 \\ 0 \\ 0 \end{bmatrix}$$

Finally, $\hat{s}_t$ is known to point in the direction of the positive lateral axis of the vehicle (y+), therefore the product of A and $\hat{s}_t$ is known:

$$A\hat{s}_t = \begin{bmatrix} 0 \\ 1 \\ 0 \end{bmatrix}$$

Consequently, when a matrix M is constructed from the three column vectors $\hat{b}_t$, $\hat{s}_t$ and $\hat{l}_t$ as follows:

$$M = [\,\hat{b}_t \;\; \hat{s}_t \;\; \hat{l}_t\,] = \begin{bmatrix} \hat{b}_{x,t} & \hat{s}_{x,t} & \hat{l}_{x,t} \\ \hat{b}_{y,t} & \hat{s}_{y,t} & \hat{l}_{y,t} \\ \hat{b}_{z,t} & \hat{s}_{z,t} & \hat{l}_{z,t} \end{bmatrix}$$

the matrix product of M and A is the 3×3 identity matrix:

$$AM = A[\,\hat{b}_t \;\; \hat{s}_t \;\; \hat{l}_t\,] = \begin{bmatrix} 1 & 0 & 0 \\ 0 & 1 & 0 \\ 0 & 0 & 1 \end{bmatrix} = I$$

Therefore A is the inverse of M, which because M is an ortho-normal matrix, is simply the transpose of M:

$$A = M^{-1} = M^T$$

Therefore:

$$A = [\,\hat{b}_t \;\; \hat{s}_t \;\; \hat{l}_t\,]^T = \begin{bmatrix} \hat{b}_{x,t} & \hat{b}_{y,t} & \hat{b}_{z,t} \\ \hat{s}_{x,t} & \hat{s}_{y,t} & \hat{s}_{z,t} \\ \hat{l}_{x,t} & \hat{l}_{y,t} & \hat{l}_{z,t} \end{bmatrix}$$

The rotational matrix A can then be used to calculate the acceleration of the vehicle in the frame of reference of the vehicle as per the formula above:

$$c_t = \begin{bmatrix} c_{x,t} \\ c_{y,t} \\ c_{z,t} \end{bmatrix} = A(a_t - l_t)$$

Equally, the result of this rotation can be scaled using the magnitude of $l_t$ to give the result:

$$c'_t = \begin{bmatrix} c'_{x,t} \\ c'_{y,t} \\ c'_{z,t} \end{bmatrix} = \frac{A}{|l_t|}(a_t - l_t)$$

Figure 10:
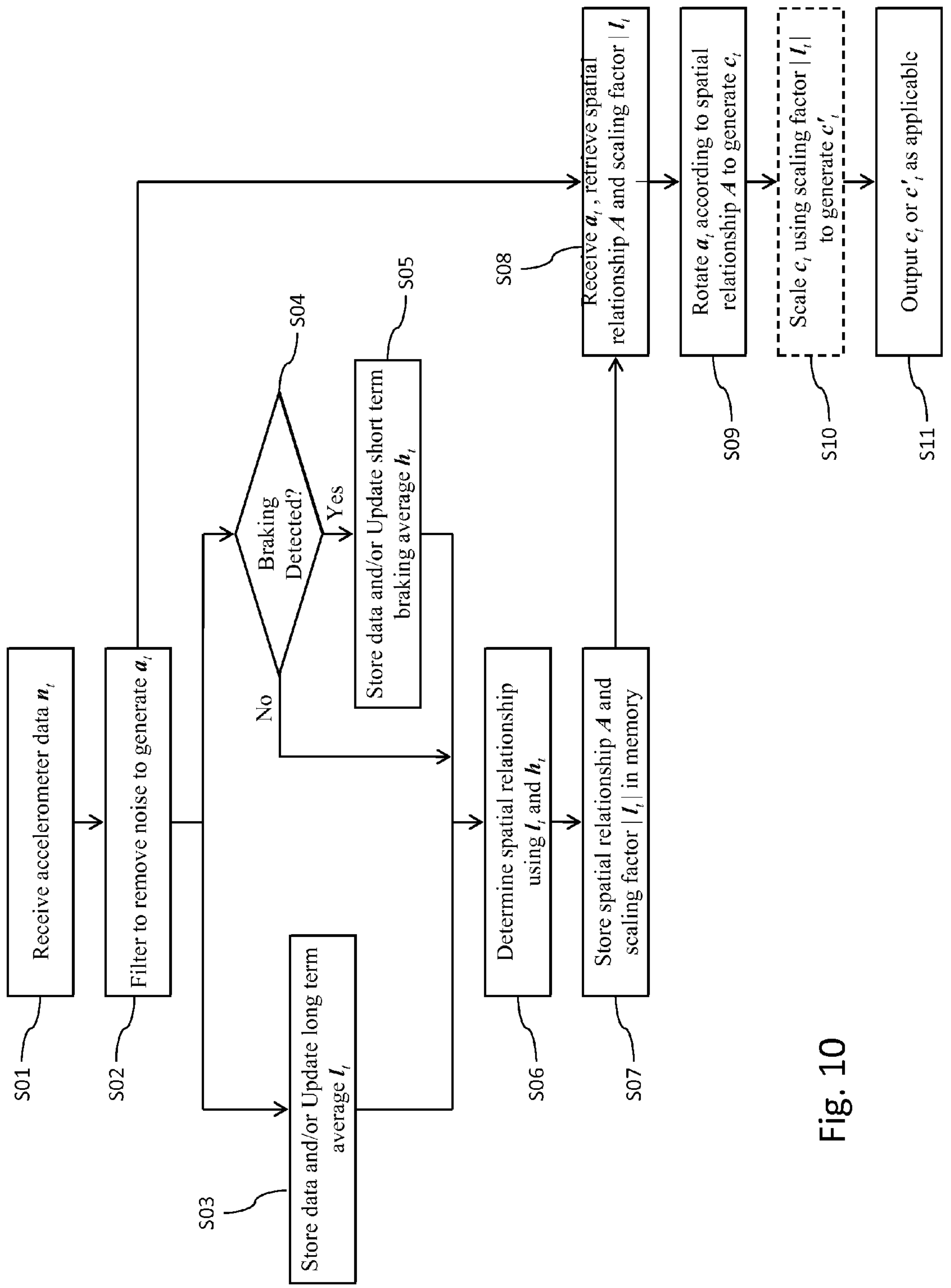
FIG. 10 is a schematic flow diagram showing a method of identifying a spatial relationship between a first and a second frame of reference according to embodiments of the invention.

A more generalized method of calculating the spatial relationship between the frame of reference of the accelerometer and the frame of reference of the vehicle will now be described with reference to FIG. 10.

In a first step S01, the noisy accelerometer data $n_t$ is received from the accelerometer, and filtered at step S02 to remove the noise and produce vector $a_t$ In step S03 the vector $a_t$ is stored and/or used to update the long term average $l_t$. It will be apparent that if a leaky integrator is used as described above, then the long term average can simply be updated. However if a more complex averaging system is used, then the vector $a_t$ may be stored, and used to periodically update the long term average rather than in response to each instance of receipt of a new data point at the time t.

At step S04, a determination is made as to whether the vehicle is braking. This can be done using the speedometer data of the vehicle, as well as the acceleration vector $a_t$ and the magnitude of the long term average $l_t$.

If braking is detected, then in steps S05 the value of $a_t$ is stored and/or the braking average $h_t$ is updated. For the same reasons give above, the braking average $h_t$ may be calculated at a later time. If braking is not detected, then the step S05 is skipped.

In step S06 the spatial relationship between the frame of reference of the accelerometer and the frame of reference of the vehicle is determined from $l_t$ and $h_t$. This spatial relationship defines the rotation(s) required to determine a direction of acceleration in the frame of reference of the vehicle from the vector $a_t$ representing acceleration in the frame of reference of the accelerometer. The spatial relationship (the rotations) is represented by A.

In step S07 the spatial relationship A and optionally a scaling factor (proportional to the magnitude of $l_t$) is stored in memory 124.

The above steps describe how the spatial relationship (and optional scaling factor) may be derived. The following steps S08 to S11 use A and optionally $l_t$ to identify vector $c_t$ or $c'_t$ (as applicable) which represent the acceleration of the vehicle in the frame of reference of the vehicle.

In step S08 a vector $a_t$ representing the acceleration of the vehicle in the frame of reference of the accelerometer is received from the noise filter (step S02). In addition the spatial relationship A and scaling factor $|l_t|$ are retrieved from the memory.

In step S09 the received accelerometer vector $a_t$ is rotated using the spatial relationship A to generate vector $c_t$ representing the acceleration of the vehicle in the frame of reference of the vehicle.

In addition, in step S10, the vector $c_t$ may be scaled using the scaling factor $|l_t|$ to provide vector $c'_t$ representing the acceleration of the vehicle in the frame of reference of the vehicle and scaled in terms of g.

Finally in step S11, the vector $c'_t$ is output by the processor. The output vector $c'_t$ may be stored in memory, or be transmitted over the mobile communications network.

The rotated (and optionally scaled) acceleration data ($c_t$ and/or $c'_t$) may be used in a number of ways by the telematics unit. For example, the acceleration data may be used to detect dangerous driving, for example by looking for high lateral accelerations (indicative of fast cornering). Equally, the accelerometer data may be used to detect overly harsh braking and/or hard acceleration from the longitudinal acceleration. Finally, the telematics unit may detect the vehicle being driven overly fast on an uneven road (or a road with traffic calming bumps) by looking at the vertical component of the accelerometer data.

The accelerometer data may also be used in "dead reckoning" for a navigation system. For example, when a vehicle enters a tunnel, or is driving down an "urban canyon" (a road between tall buildings) the quality of a GPS signal may drop, so that the vehicles position is no longer known. The accelerometer data may consequently be used to calculate an approximate position of the vehicle by integrating the vehicles acceleration (from a starting point where both position and velocity are known). Dead reckoning is known in the art, and need not be described further.

Additional Details and Modifications

The calculations above used to derive the spatial relationship between the frames of reference may be performed as many times as is necessary to ensure that the spatial relationship is accurate. For example, the system may be arranged to fix the values of A and $|l_t|$ once a predetermined number of samples of the accelerometer data (and of the braking data) have been received. The fixed values will then be used until the unit is reset (representing, for example, that the telematics unit has been moved). After this reset the telematics unit may be arranged to recalculate the values of A and $|l_t|$.

As an alternative, the values of A and $|l_t|$ may be constantly updated as accelerometer data is received by the telematics unit. Both embodiments above have derived a scaling factor for the accelerometer data based on $|l_t|$. However, in other embodiments, the output of the accelerometer may be calibrated in terms of its magnitude. Therefore only the spatial relationship needs to be worked out, since the magnitude of the acceleration will be known from the magnitude of the accelerometer data.

The zero point of the accelerometer data $a_t$ may drift, that is, when the accelerometer is under zero acceleration (free fall):

$$a_t \neq \begin{bmatrix} 0 \\ 0 \\ 0 \end{bmatrix}$$

The magnitude and direction of this drift may vary with temperature resulting in errors in the accelerometer data. By subtracting the long term average vector $l_t$ from the accelerometer data, these errors may be reduced (since $l_t$ contains both the drift error as well as the gravitational component). However, other known methods (for example, prior temperature calibration) may additionally be used to reduce the drift in the accelerometer data.

In the examples above, the vectors have all been identified using the time index t. However it will be readily realized that this index is for clarity of the method described above and the index does not need to be stored or referenced by the telematics unit for embodiments of the invention to work. In other words, if leaky integrators are used to calculate the averages, then no historic values, except a running average for each integrator, need to be stored, therefore each of the calculations described above can be considered to use the current values of any particular variable (which will be the only ones available), rather than retrieving particular values based on the current index value.

In the example above, 0.25 g has been used as a threshold for harsh braking. However any appropriate value may be used, for example 0.1 g, 0.5 g or even 1 g. The threshold may be variable, for example to suit the vehicle type (harsh braking in a car will likely be higher than harsh braking in a truck). The accelerations given above may also be used as thresholds in the changes in speed (i.e. to detect harsh braking as a change in miles per hour, per second).

In the first embodiment described above, the rotations are calculated to be applied (to rotate vector $a_t$) in the order x, y and then z. However it will be apparent that this is purely exemplary and that the rotations may be applied in any order.

The axes used in the above embodiment have all been right handed, however in some embodiments a left handed series of axes may be used. Equally, accelerometer devices may be used which provide an output using a left handed set of axes. Moreover, while the rotations described above have been arranged to rotate the accelerometer data to the SAE J670 standard, this is purely exemplary, and any set of suitable axes may be chosen for the calibrated output of the accelerometer.

The above embodiments have been described as using leaky integrators with specified leaking factors. It will be understood that these are purely exemplary and that any other form of filtering or averaging may be used. The filters may be provided by dedicated hardware, or may be provided in software or a combination of the two. The filters may use the memory to store one or more historic values (such as the running average in the case of a leaky integrator), or may be provided with their own dedicated memory.

The period over which the data is averaged may be varied to suit circumstances. For example, while the harsh braking filter has been described in the context of a leaky integrator with a short time period, a longer time period may be used, so as to average multiple braking events. Alternatively, a first filter may be used to average a single braking event, and then the average of a number of braking events may be used to determine the direction of the braking vector.

The frequency response of the noise filter may be adjusted to provide the best noise filtering. This may be dependent on the type of filter used, but will typically be in the range of 1 to 15 Hz, with 4 to 8 Hz providing a more specific range. Alternatively the noise filter may be omitted in some embodiments.

Equally the averaging period of the long term averaging filter may be varied. It is desirable for the long term averaging filter to use a long enough averaging period so that the many small deviations (due to e.g. accelerating, cornering etc.) cancel out. However the length of this period must be short enough for a value for $l_t$ to be reached without an unreasonable lag period. The averaging period for the determination of the long term average will likely be in the range from 10 minutes to one hour, however much longer periods may be used (for example many hours).

The above embodiments have been described in which the data defining the vehicle's speed is received via an OBD connector. The OBD standard is used by most car manufacturers, therefore this provides a convenient method for receiving speedometer data from a vehicle. Nevertheless, other methods, including using proprietary sensors, or another form of communication with the ECUs within the vehicle, may be used to determine the speed of the vehicle. Equally, any particular OBD related standard, for example European-OBD (EOBD) and Japanese-OBD (JOBD) may be used. In such alternative embodiments, the OBD connector 110 and driver circuitry 120 may be replaced by suitable alternative connectors/circuitry.

The embodiments described above use the speedometer data in preference to GPS data. One reason for this is that the speedometer will have a faster reaction time over GPS data, therefore the detection of braking events is easier to determine However GPS may be used as an alternative or in addition to the speedometer data.

The accelerometer has been described as being mounted internally to the telematics unit. However this may not be the case and the accelerometer may be provide as an external module to the telematics unit, to be connected to the telematics unit using a cable or a short range wireless link.

In the embodiments above, two different methods of determining the spatial relationship between the frame of reference of the vehicle and that of the accelerometer are described. However these are not to be taken as limiting, and any other suitable technique may be used. In particular, any technique uses two vectors in a first frame of reference which are aligned with known directions in the second frame of reference may be used to determine the spatial relationship between the two frames of reference.

The telematics unit has been described above with a number of specified features, however it will be realized that many of the features are optional; in particular, in some embodiments, one or more of: the GPS unit and connector (104 and 114); the mobile communications unit and connector (106 and 116) and user interface driver and connector (108 and 118) may be excluded.

In addition, it will be realized that while the telematics unit 100 has been described simply with a processor 122 and memory 124 for determining and storing the spatial relationship, and appropriate hardware may be used. This may include providing dedicated hardware arranged to perform one or more of the steps described above.

The memory may be volatile or non-volatile or a combination of the two. If present, the non-volatile memory may be a flash, EPROM or disk based memory. The memory may store the spatial relationship between the two frames of reference and optionally the scaling factor. In addition, the memory may store historic values of the acceleration vectors received by the system (either rotated or un-rotated) such that this data may be subsequently retired. If the memory includes a non-volatile memory, this may be used to store a backup of the calculated spatial relationship as well as the running averages calculated by the leaky integrators (if applicable). These values would be stored in case of a loss of power (for example if the ignition of the vehicle is switched off, or if the battery of the vehicle fails) and therefore would be available to the telematics unit when the power returns.

In the embodiments above, it has been assumed that the harsh braking is detected solely by looking at the magnitude of the acceleration (deceleration). However more advanced techniques are envisaged to detect the braking events. For example the magnitude of the acceleration from the speedometer data may be compared to the accelerometer data (without gravity), and if there is a large discrepancy, then the telematics unit may determine that there is a significant component of lateral acceleration (due to turning) and reject the accelerometer data received during that time (that is, to not use that accelerometer data to update the harsh braking vector).

In the above embodiments, braking events have been determined based on the change in speed. However, additional data may be received and used by the telematics unit. For example the ABS ECU may transmit data on the in vehicle network when the brakes of the vehicle are applied. This data may be provided through the OBD connection to enable the telematics unit to directly determine braking events. Alternatively or additionally, data on the position of the steering wheel may be received by the telematics unit, and used to determine whether the vehicle is turning during the braking events (so as to ensure that the braking vector has a minimal lateral component).

In the above embodiments the long term average vector $l_t$ is determined from either all samples of the acceleration vector $a_t$, or at least, a subset received during a period such as when the ignition of the vehicle is on. However other criteria may be used. For example the telematics unit may look for whether the engine of the vehicle is running, or for periods in which the speed of the vehicle is, for example, constant, or above or below a threshold. As an alternative, the telematics unit may look for a period of, for example, a minute, when the vehicle is moving at a constant speed and in which the direction of the acceleration vector $a_t$ does not change (or changes within certain limits). This would indicate that the vehicle was travelling along a substantially straight and horizontal road at a constant speed (a possibility on a highway or similar road). The long term average vector $l_t$ may therefore be quickly calculated from an average of the acceleration vector $a_t$ received during this time. As a consequence of using these other criteria to determine $l_t$, the period over which $l_t$, is calculated may be substantially reduced; that is the averaging period may be of 10 to 60 seconds.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

The invention claimed is:

1. A system for identifying a spatial relationship between a first and a second frame of reference for use in calibrating accelerometer data, the first frame of reference being associated with an accelerometer mounted in a vehicle, and the second frame of reference being associated with the vehicle, the system comprising:

an interface for receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and a data processing system, wherein the data processing system is arranged to:

derive, from a first set of said vector data received during a first period, a first vector indicative of a direction of a vertical axis of the vehicle within the first frame of reference;

identify, using the vehicle information, a second period in which the speed of the vehicle is changing;

derive, from a second set of said vector data received during the second period, a second vector indicative of a direction of a longitudinal axis of the vehicle within the first frame of reference; and identify, based on the first and second vectors, a spatial relationship between the first and the second frame of reference.

2. The system of claim 1, wherein the system is arranged to identify, using the vehicle information, the first period.

3. The system of claim 2, wherein the system is arranged to identify, from the vehicle information, one or more of: whether an ignition of the vehicle is on; whether an engine of the vehicle is running; and the speed of the vehicle, whereby to identify the first period.

4. The system of claim 1, wherein the system is configured to calculate a first average of the first set of vector data whereby to derive the first vector.

5. The system of claim 4 wherein the system is configured to use a filter to calculate the first average.

6. The system of claim 1, wherein the system is arranged to identify, from the vehicle information, a period in which the vehicle is braking whereby to identify the second period.

7. The system of claim 1, wherein the interface is arranged to receive vehicle information comprising information indicative of a speed of rotation of a shaft of the vehicle, and the data processing system is arranged to identify the second period using said information indicative of a speed of rotation of a driven shaft of the vehicle.

8. The system of claim 6, wherein the system is arranged to further determine magnitudes of acceleration from the vector data and to compare said magnitudes to a threshold whereby to identify the second period.

9. The system of claim 8 wherein the system is arranged to determine magnitudes of differences between the vector data and the first vector whereby to determine said magnitudes of acceleration.

10. The system of claim 8 wherein the system is arranged to determine magnitudes of components of the vector data orthogonal to the first vector whereby to determine said magnitudes of acceleration.

11. The system of claim 1, wherein the system is arranged to calculate a second average of the second set of vector data whereby to derive the second vector.

12. The system of claim 11 wherein the system is arranged to use a filter to calculate the second average.

13. The system of claim 11, wherein the system is arranged to derive a component of the second average which is orthogonal to the first vector whereby to determine the second vector.

14. The system of claim 1, wherein the system is arranged to identify a plurality of rotations based on the directions of the first and second vectors whereby to identify the spatial relationship between the first and the second frame of reference.

15. The system of claim 1, wherein the system is arranged to calibrate accelerometer data received by the interface using the identified spatial relationship.

16. The system of claim 1, comprising a memory arranged to store the first and second averages.

17. The system of claim 1, wherein the first and second frames of reference comprise three dimensional frames of reference.

18. The system of claim 1, wherein the vehicle network comprises an on-board vehicle network arranged to interconnect a plurality of electronic control units of the vehicle.

19. The system of claim 1, wherein the interface comprises a connector arranged to connect to an on board diagnostics port of a vehicle.

20. A telematics unit for mounting in a vehicle, the telematics unit comprising:

an accelerometer arranged to provide accelerometer data comprising vector data indicative of a direction of an acceleration of the accelerometer in a first frame of reference;

an interface in communication with a vehicle network of the vehicle and arranged to receive vehicle data comprising vehicle information indicative of an operative state of the vehicle; and a data processing system for identifying a spatial relationship between the first frame of reference and a second frame of reference associated with the vehicle for use in calibrating said accelerometer data, wherein the data processing system is arranged to:

derive, from a first set of said vector data received during a first period, a first vector indicative of a direction of a vertical axis of the vehicle within the first frame of reference;

identify, using the vehicle information, a second period in which the speed of the vehicle is changing;

derive, from a second set of said vector data received during the second period, a second vector indicative of a direction of a longitudinal axis of the vehicle within the first frame of reference; and identify, based on the first and second vectors, a spatial relationship between the first and the second frame of reference.

21. A method for identifying a spatial relationship between a first and a second frame of reference for use in calibrating accelerometer data, the first frame of reference being associated with an accelerometer mounted in a vehicle, and the second frame of reference being associated with the vehicle, the method comprising:

receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and deriving, from a first set of said vector data received during a first period, a first vector indicative of a direction of a vertical axis of the vehicle within the first frame of reference;

identifying, using the vehicle information, a second period in which the speed of the vehicle is changing;

deriving, from a second set of said vector data received during the second period, a second vector indicative of a direction of a longitudinal axis of the vehicle within the first frame of reference; and identifying, based on the first and second vectors, a spatial relationship between the first and the second frame of reference.

22. The method of claim 21, comprising identifying, using the vehicle information, the first period.

23. The method of claim 22, comprising identifying one or more of:

whether an ignition of the vehicle is on; whether an engine of the vehicle is running;

and the speed of the vehicle, whereby to identify the first period.

24. The method of claim 21, comprising calculating a first average of the first set of vector data whereby to derive the first vector.

25. The method of claim 24 comprising using a filter to calculate the first average.

26. The method of claim 21, comprising identifying, from the vehicle information, a period in which the vehicle is braking whereby to identify the second period.

27. The method of claim 21, comprising receiving vehicle information comprising information indicative of a speed of rotation of a shaft of the vehicle, and using said information indicative of a speed of rotation of a driven shaft of the vehicle whereby to identify the second period.

28. The method of claim 26, comprising determining magnitudes of acceleration from the vector data and comparing said magnitudes to a threshold whereby to identify the second period.

29. The method of claim 28 comprising determining magnitudes of differences between the vector data and the first vector whereby to determine said magnitudes of acceleration.

30. The method of claim 28 comprising determining magnitudes of components of the vector data orthogonal to the first vector whereby to determine said magnitudes of acceleration.

31. The method of claim 21, comprising calculating a second average of the second set of vector data whereby to derive the second vector.

32. The method of claim 31 comprising using a filter to calculate the second average.

33. The method of claim 31, comprising deriving a component of the second average which is orthogonal to the first vector whereby to determine the second vector.

34. The method of claim 21, comprising identifying a plurality of rotations based on the directions of the first and second vectors whereby to identify the spatial relationship between the first and the second frame of reference.

35. The method of claim 21, comprising calibrating accelerometer data received by the interface using the identified spatial relationship.

36. The method of claim 21, comprising storing the first and second averages.

37. The method of claim 21, wherein the first and second frames of reference comprise three dimensional frames of reference.

38. The method of claim 21, wherein the vehicle network comprises an on-board vehicle network arranged to interconnect a plurality of electronic control units of the vehicle.

39. A computer readable storage medium storing computer readable instructions thereon for execution on a computing system to implement a method for identifying a spatial relationship between a first and a second frame of reference for use in calibrating accelerometer data, the first frame of reference being associated with an accelerometer mounted in a vehicle, and the second frame of reference being associated with the vehicle, the method comprising:

receiving accelerometer data from the accelerometer and vehicle data from a vehicle network of the vehicle, wherein the accelerometer data comprises vector data indicative of a direction of an acceleration of the accelerometer in the first frame of reference, and wherein the vehicle data comprises vehicle information indicative of an operative state of the vehicle; and deriving, from a first set of said vector data received during a first period, a first vector indicative of a direction of a vertical axis of the vehicle within the first frame of reference;

identifying, using the vehicle information, a second period in which the speed of the vehicle is changing;

deriving, from a second set of said vector data received during the second period, a second vector indicative of a direction of a longitudinal axis of the vehicle within the first frame of reference; and identifying, based on the first and second vectors, a spatial relationship between the first and the second frame of reference.

* * * * *